(12) United States Patent
Spencer (10) Patent No.: US 8,256,820 B2
(45) Date of Patent: Sep. 4, 2012

(54) ADJUSTABLE TOOLBOX

(75) Inventor: Michael R. Spencer, Hubbard, NE (US)

(73) Assignee: Truxedo, Inc., Yankton, SD (US)

( * ) Notice: Subject to any disclaimer, the term of this patent is extended or adjusted under 35 U.S.C. 154(b) by 0 days.

(21) Appl. No.: 12/983,483

(22) Filed: Jan. 3, 2011

(65) Prior Publication Data

US 2011/0132947 A1 Jun. 9, 2011

Related U.S. Application Data

(63) Continuation-in-part of application No. 12/275,910, filed on Nov. 21, 2008, now Pat. No. 7,887,114.

(60) Provisional application No. 60/989,509, filed on Nov. 21, 2007, provisional application No. 61/041,016, filed on Mar. 31, 2008.

(51) Int. Cl.
*B60R 9/06* (2006.01)
(52) U.S. Cl. .................................................. 296/37.6
(58) Field of Classification Search .................. 296/37.6
See application file for complete search history.

(56) References Cited

U.S. PATENT DOCUMENTS

| | | | |
|---|---|---|---|
| 4,946,215 A | 8/1990 | Taylor | |
| 5,605,264 A | 2/1997 | Neal | |
| 5,924,616 A | 7/1999 | Shives | |
| 5,992,719 A | 11/1999 | Carter, III | |
| 6,116,673 A * | 9/2000 | Clonan | 296/37.6 |
| 6,276,735 B1 | 8/2001 | Champion | |
| 6,634,691 B2 * | 10/2003 | Henderson | 296/37.6 |
| 7,537,264 B2 * | 5/2009 | Maimin et al. | 296/100.09 |
| 2006/0102669 A1 | 5/2006 | Fouts et al. | |
| 2006/0244279 A1 * | 11/2006 | Ranka et al. | 296/37.6 |
| 2007/0046056 A1 * | 3/2007 | Delaney et al. | 296/37.6 |

* cited by examiner

*Primary Examiner* — Dennis Pedder
(74) *Attorney, Agent, or Firm* — Harness, Dickey & Pierce, P.L.C.

(57) ABSTRACT

An adjustable toolbox for use in conjunction with a bed on a pickup. The adjustable toolbox includes a base portion, a mounting portion and a lid portion. The base portion has a recess formed therein that is adapted to receive at least one object. The mounting portion is operably attached to the base portion so that at least part of the mounting portion is slidable with respect to the base portion to adjust a width of the adjustable toolbox. The lid portion is operably attached to at least one of the base portion and the mounting portion.

16 Claims, 9 Drawing Sheets

ADJUSTABLE TOOLBOX

CROSS-REFERENCE TO RELATED APPLICATIONS

This application is a continuation-in-part of U.S. patent application Ser. No. 12/275,910 filed on Nov. 21, 2008, which claims the benefit of U.S. Provisional Application No. 60/989,509, filed on Nov. 21, 2007 and U.S. Provisional Application No. 61/041,016, filed on Mar. 31, 2008. The entire disclosure of each of the above applications is incorporated herein by reference.

FIELD

The present disclosure relates to storage containers for vehicles and, more particularly, relates to storage containers for pickups.

BACKGROUND

This section provides background information related to the present disclosure which is not necessarily prior art.

Pickups are a quite popular type of vehicle because the pickups enable objects of various sizes to be placed in the bed of the pickup and then be transported. The bed of the pickup generally has a floor surface that is bounded by a front wall, a pair of upstanding sidewalls, and a back wall or tailgate.

At least one of the front wall, the upstanding sidewalls and the back wall may be movable to facilitate placing objects into the bed and removing objects from the bed. For example, the back wall of many pickup beds may pivot from a closed position in which the back wall is substantially vertically oriented to an open position in which the back wall is substantially horizontally oriented.

While the front wall, the sidewalls and the back wall preclude objects from sliding out of the pickup bed, these walls do not retain objects at specific locations within the pickup bed.

Additionally, the open top of the pickup bed does not shield or otherwise protect objects stored in the pickup bed from damage by environmental factors such as rain and snow. The open top of the pickup bed also means that objects placed in the pickup bed are visible to persons near the pickup bed, which makes the objects vulnerable to theft.

To protect objects placed in the bed of a pickup from damage from environmental factors or theft, tonneau covers may be placed over the bed to substantially cover the bed. The tonneau covers are typically attached to the sides of the pickup bed.

There are two primary types of tonneau covers—hard and soft. Hard tonneau covers have a relatively hard surface that extends over the pickup bed. The hard tonneau covers may be in a single piece or in several pieces that are pivotable with respect to each other.

Soft tonneau covers, on the other hand, are made from a flexible material such as vinyl that permits the soft tonneau covers to be at least partially rolled up to provide access to items stored in the pickup bed.

To retain objects at desired locations in the pickup bed and thereby enhance the ability to access such items, a toolbox may be attached to the pickup box. The toolboxes typically include a box and a lid pivotally attached thereto. The toolboxes are typically mounted to the side of the pickup bed proximate the front end of the pickup bed.

Because the toolboxes extend over the sides of the pickup bed, it is not possible to use conventional tonneau covers in pickup beds that also have a toolbox attached thereto. Rather, it is necessary to purchase a special size tonneau cover that may be used in conjunction with the toolbox.

The special size tonneau cover may only be used when the toolbox is in the pickup bed because the special size tonneau cover would only cover a portion of the pickup bed when the toolbox is removed.

SUMMARY

This section provides a general summary of the disclosure, and is not a comprehensive disclosure of its full scope or all of its features.

According to an embodiment of the invention, an adjustable toolbox is provided. The adjustable toolbox has an adjustable width that enables the adjustable toolbox to be used in conjunction with pickup beds having a variety of widths.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An embodiment of the invention is directed to an adjustable toolbox, as illustrated at 10 in the Figures. The adjustable toolbox 10 may generally include a base portion 20, a lid portion 22, and a mounting portion 24, as illustrated throughout the figures.

The adjustable toolbox 10 may be readily adapted for pickup beds having a variety of widths and for pickup beds having parallel and non-parallel sidewalls. In this regard, pickup beds typically define a distance between opposing sidewalls. This distance can vary from one pickup model to another pickup model. Moreover, for a single pickup model, the sidewalls can be designed or inadvertently become non-parallel such that a distance between the opposing sidewalls varies from one location to another. The adjustable toolbox 10 of the present teachings may be used with pickup beds of varying models and with parallel and non-parallel sidewalls without major modification of adjustable toolbox 10. Furthermore, adjustable toolbox 10 can be used in pickup beds that are open as well as pickup beds that have hard or soft tonneau covers. The components of the adjustable toolbox 10 provide a high strength adjustable toolbox that can be manufactured at a relatively low cost compared with prior art toolboxes for use in a wide variety of pickup model applications.

Figure 7:
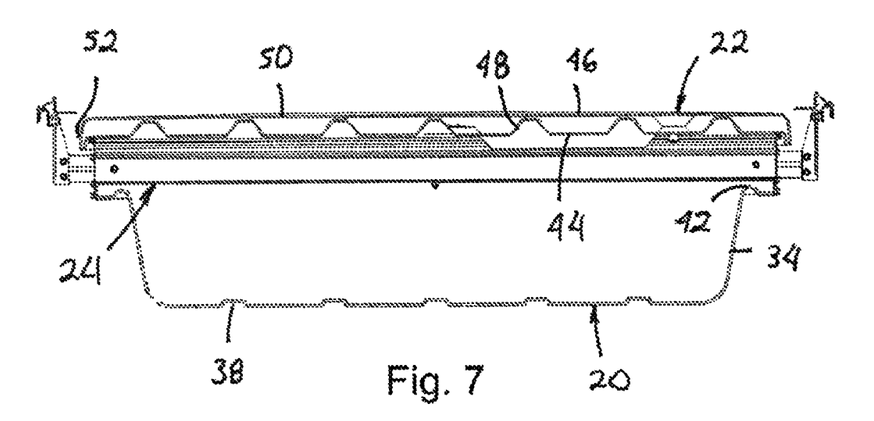
FIG. 7 is a sectional view of the adjustable toolbox taken along a line 7-7 in FIG. 4.
Figure 8:
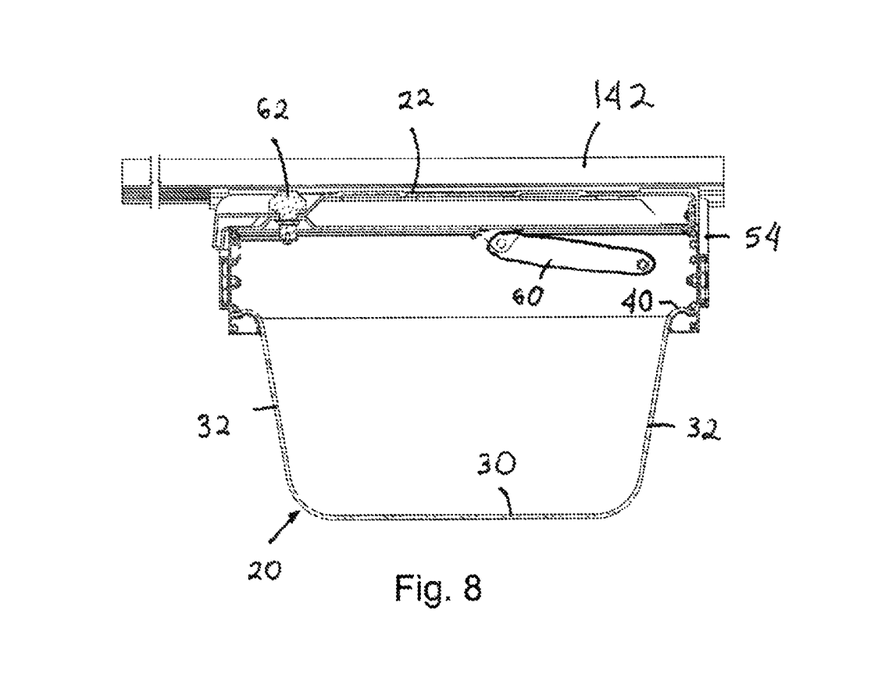
FIG. 8 is a sectional view of the adjustable toolbox taken along a line 8-8 in FIG. 6.

With particular reference to FIGS. 1-8, in some embodiments, the base portion 20 is defined by a bottom wall 30, a pair of sidewalls 32 and a pair of end walls 34 that together define an enclosed region with an upwardly directed opening (see FIGS. 7 and 8). In one configuration, the bottom wall 30, the pair of sidewalls 32 and the pair of end walls 34 are integrally fabricated.

The sidewalls 32 and the end walls 34 may be generally vertically oriented. In certain embodiments, the sidewalls 32 and the end walls 34 may be oriented at an angle with respect to the bottom wall 30 of between about 90 and 120 degrees.

To enhance the strength of the sidewalls 32 and the end walls 34, as least one rib may be provided in at least one of the sidewalls 32 and the end walls 34. At least one rib 38 may also be formed in the bottom wall 30.

Another benefit of placing the at least one rib 38 in the bottom wall 30 is that the at least one rib 38 may facilitate maintaining objects at desired locations within the adjustable toolbox 10. In this regard, the at least one rib 38 formed in the bottom wall 30 may have a greater height than the at least one rib 36 formed in the sidewalls 32 and the end walls 34.

As illustrated in FIG. 8, to facilitate attachment of the base portion 20 to the mounting portion 24, an outwardly extending lip 40 may be provided along an upper edge of at least one of the sidewalls 32 (FIG. 7). An outwardly extending lip 42 may also be provided on at least one of the end walls 34. As illustrated in the figures, the lip 40 and the lip 42 may be curved.

The base portion 20 may be fabricated from a variety of materials and techniques utilizing the concepts of the invention. One suitable material for fabricating the base portion 20 is a thermoplastic olefin. Examples of techniques that may be used to fabricate the base portion 20 are vacuum forming, injection molding and rotational molding.

The base portion 20 may be formed with a length, width and depth based upon the vehicle in which the adjustable toolbox 10 is intended to be used. To maximize the storage capacity of the adjustable toolbox 10, the length of the adjustable toolbox 10 may be selected to be approximately the same as a width of the pickup bed in which the adjustable toolbox 10 is intended to be used.

In one configuration, the base portion 20 has a length of up to about 72 inches and preferably between about 40 and 60 inches, a width of up to about 36 inches and preferably between about 12 and 24 inches, and a height of up to about 24 inches and preferably between about 6 and 18 inches.

A thickness of the bottom wall 30, the pair of sidewalls 32 and the pair of end walls 34 may be selected based upon the anticipated conditions under which the adjustable toolbox 10 will be used, such as the weight of the object that will be placed in the adjustable toolbox 10.

When the base portion 20 is fabricated from molded plastic, the bottom wall 30, the sidewalls 32 and the end walls 34 may have a thickness of up to about ¾ of an inch and preferably about 3/16 of an inch.

While the base portion 20 is illustrated as having a single wall construction, it is possible to use other configurations in conjunction with the concepts of this invention, examples of which include multiple layer walls and corrugated walls.

To further enhance the durability of the base portion 20, a coating may be applied to the inner surface thereof. An example of one such coating is a transparent acrylic film, such as is available under the designation KORAD from Spartech PEP.

As an alternative to using a single base portion 20, it is possible to form the base portion 20 in at least two sections. These sections may have different dimensions such as a different depth or that have different features to facilitate organizing particular types of objects.

In certain embodiments, the adjustable toolbox 10 may be formed without a lid portion 22. As is discussed in more details herein, the adjustable toolbox 10 may be used in conjunction with a tonneau cover that extends over the adjustable toolbox 10 and thereby covers the adjustable toolbox.

Figure 1:
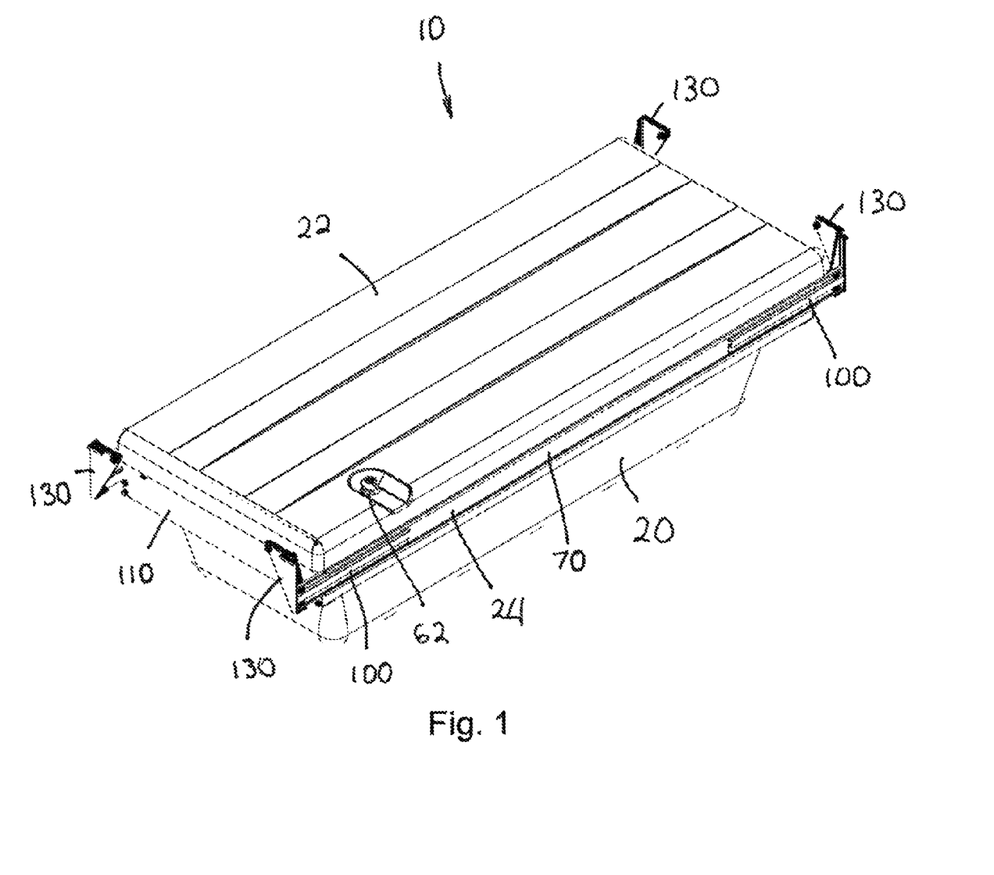
FIG. 1 is a perspective view of an adjustable toolbox according to an embodiment of the invention.

The lid portion 22 may have a length and a width that generally corresponds to the length and the width of the base portion 20 such that the lid portion 22 substantially covers the base portion 20 when the lid portion is placed over the base portion 20, as illustrated in FIGS. 1, 7 and 8.

As illustrated in FIG. 7, to enhance the strength of the lid portion 22, the lid portion 22 may be formed with an inner lid member 44 and an outer lid member 46 that are joined together at intermediate locations therein. Alternatively or in addition to forming the lid portion 22 with the two-part configuration, it is possible to form the lid portion 22 with at least one rib 48. The at least one rib 48 may be oriented in a variety of directions.

The lid portion 22 may be fabricated from a variety of materials and techniques utilizing the concepts of the invention. One suitable material for fabricating the lid portion 22 is a thermoplastic olefin. It is also possible to fabricate the lid from a metallic material such as aluminum. Examples of techniques that may be utilized to fabricate the lid portion 22 are vacuum forming, injection molding and rotational molding.

The lid portion 22 may be formed with a central region 50 and a side region 52. The side region 52 extends from the central region 50 along at least one side thereof. In addition to increasing the strength of the lid portion 22, the side region 52 may also help to seal the adjustable toolbox 10 to reduce the potential of water such as rain from entering the adjustable toolbox 10.

While the lid portion 22 is illustrated as being a single piece, the lid portion 22 may take alternative configurations such as having two or more sections. Using these alternative configurations permits the lid portion 22 covering one of the sides of the adjustable toolbox 10 to be opened without opening the entire lid portion 22.

The lid portion 22 may be mounted using a variety of techniques. One such suitable technique is pivotally mounting in which the lid portion 22 is generally vertically oriented when in an open configuration and generally horizontally oriented when in a closed configuration. While not illustrated, it is possible to use other techniques for mounting the lid portion 22, an example of one such technique is sliding.

Figure 2:
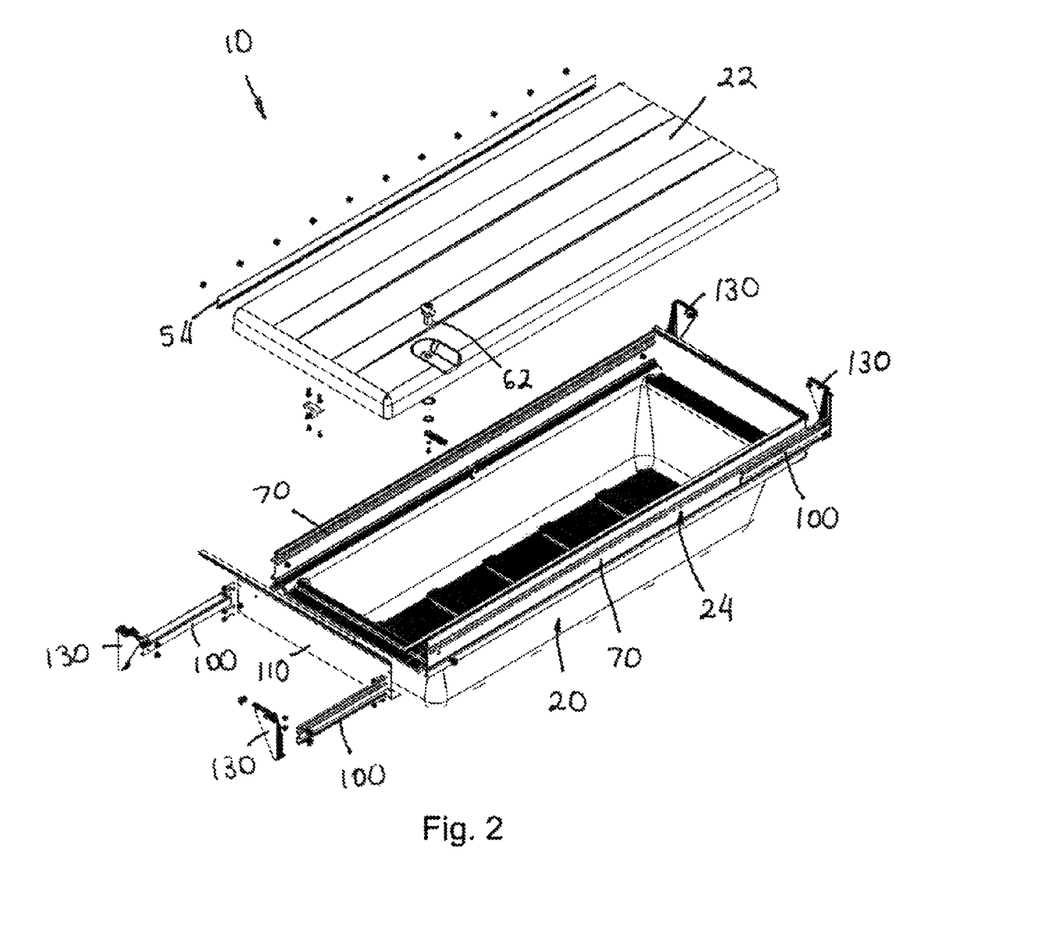
FIG. 2 is an exploded perspective view of the adjustable toolbox.
Figure 3:
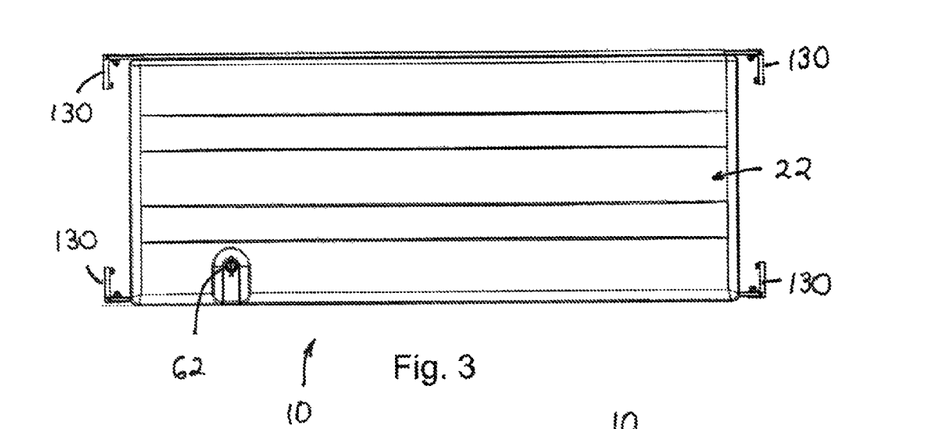
FIG. 3 is a top view of the adjustable toolbox.
Figure 4:
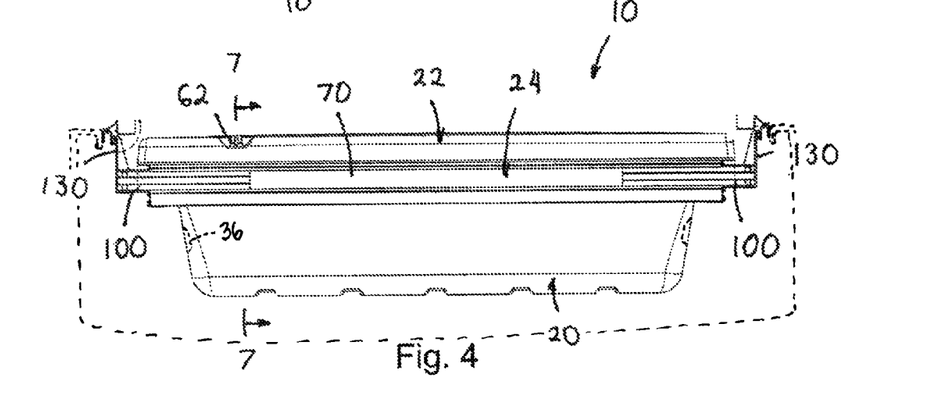
FIG. 4 is a front view of the adjustable toolbox with the pickup bed schematically shown in phantom.
Figure 5:
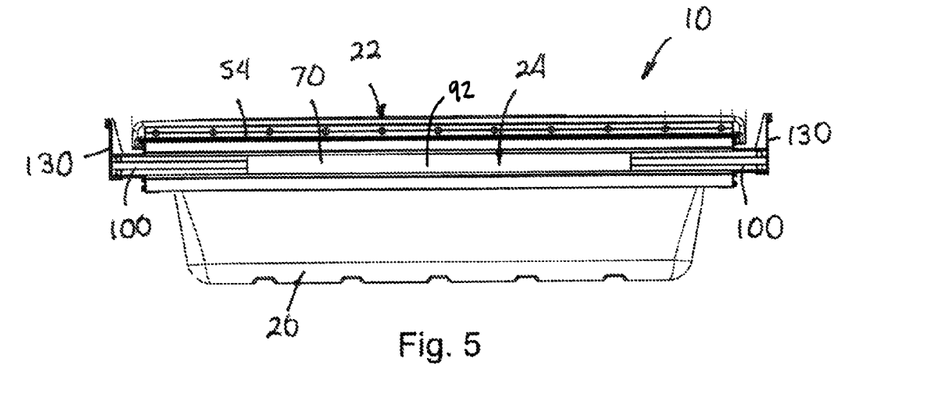
FIG. 5 is a back view of the adjustable toolbox.
Figure 6:
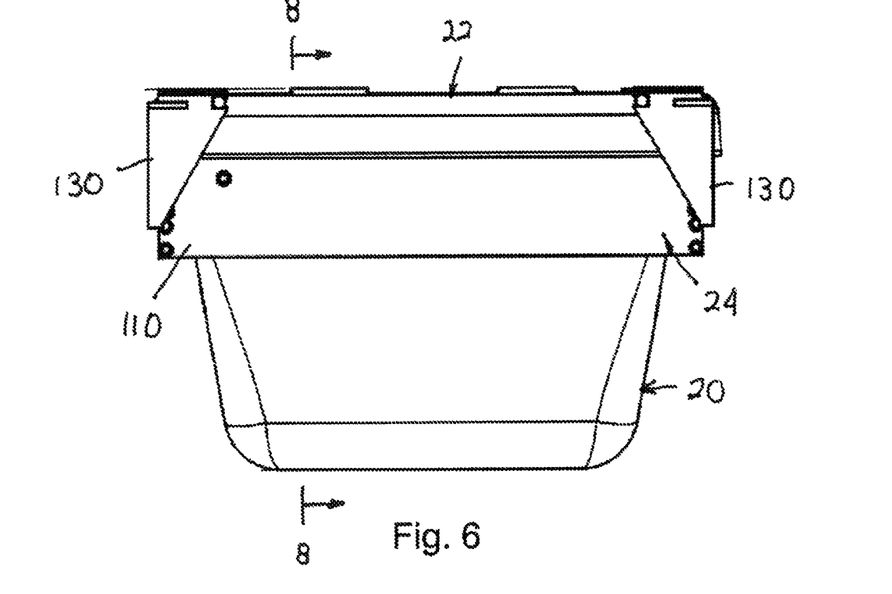
FIG. 6 is an end view of the adjustable toolbox.
Figure 9:
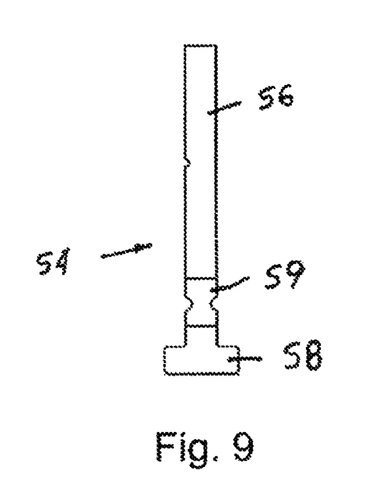
FIG. 9 is a hinge mechanism for operably attaching a lid portion of the adjustable toolbox.

A variety of techniques may be used to pivotally mount the lid portion 22, as illustrated in FIGS. 2, 5, and 9. One such technique is a living hinge 54 that includes an upper hinge section 56, a lower hinge section 58 that are operably connected with a flexible central section 59. The living hinge 54 may extend substantially along the length of the adjustable toolbox 10. In addition to pivotally mounting the lid portion 22, the living hinge 54 restricts the entry of water into the adjustable toolbox 10. It is also possible to attach the lid portion 22 using a conventional hinge (not shown) having a pair of hinge leaves that are pivotally attached with a hinge pin.

To reduce the potential of water entering the sides and the front of the adjustable toolbox 10, a weather-strip 76 (FIG. 10) may be provided along the sides and the front of the adjustable toolbox 10. The weather-strip 76 may seat in the channel 82 (FIG. 11) at the upper end of the mounting rail 70 and the channel 118 (FIG. 12) at the upper end of the end frame 110.

Figure 10:
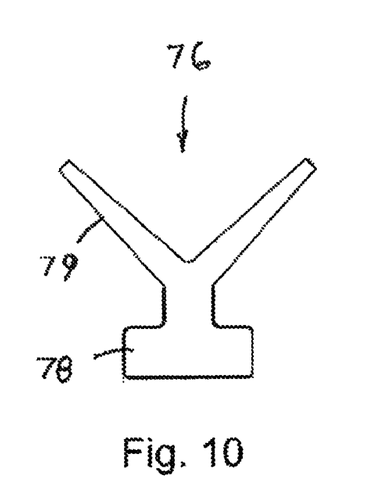
FIG. 10 is a sealing mechanism for use in the adjustable toolbox.

In one configuration, the weather-strip 76 may include a lower section 78 and an upper section 79, as illustrated in FIG. 10. The lower section 78 may include a shape that substantially conforms to the shape of the channel 82 or the channel 118. In one configuration, the upper section 79 includes two extensions that are oriented at an angle with respect to each other. The weather-strip 76 may be fabricated from a resilient material so that the weather-strip 76 deforms as the lid portion 22 is closed to form a substantially waterproof seal.

To maintain the lid portion 22 in an open configuration, a gas spring 60 (FIG. 8) may be attached to the lid portion 22 and the base portion 20. The gas spring 60 may be selected with a strength depending on the weight of the lid portion 22 such that the gas spring 60 resists inadvertent closing of the lid portion 22.

As illustrated in FIGS. 1-4 and 8, the adjustable toolbox 10 may also include a lock mechanism 62 to restrict access to objects stored in the adjustable toolbox 10. The lock mechanism 62 may include a striker that is mounted to the base portion 20.

The lock mechanism 62 may include a latch assembly that is attached to the lid portion 22. The latch assembly may include a striker pin that is pivotally mounted therein. The striker pin is adapted to engage the striker to retain the lid portion 22 in the closed position.

Figure 11:
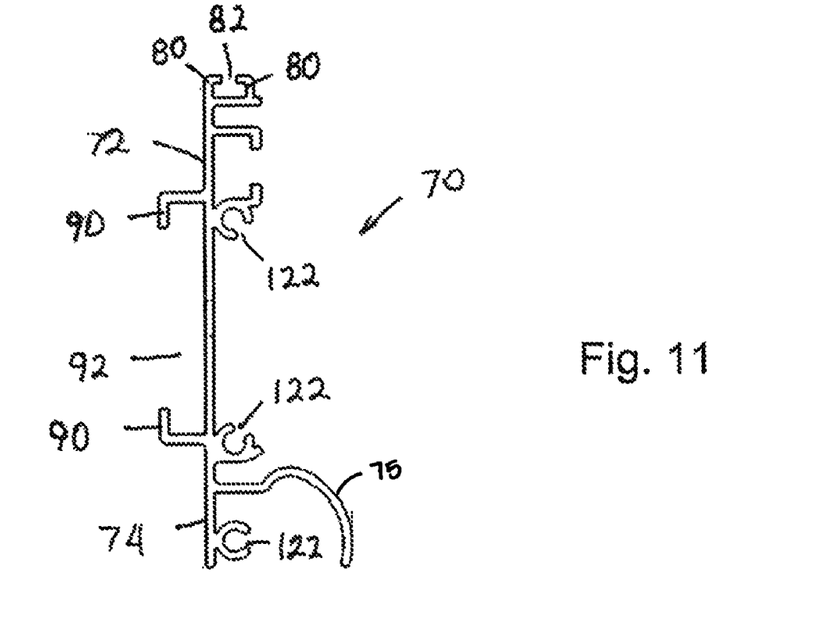
FIG. 11 is an end view of an end panel of the adjustable toolbox.
Figure 12:
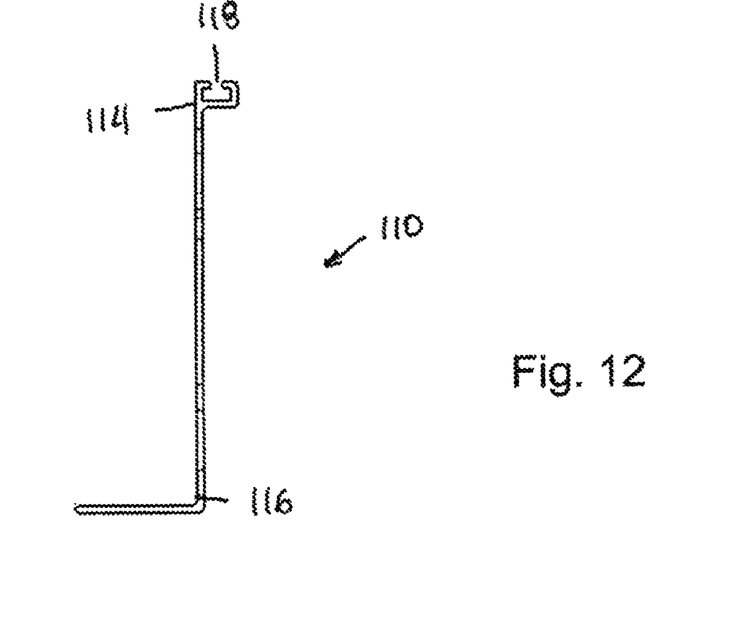
FIG. 12 is an end view of a side panel.

The mounting portion 24 may include a pair of mounting rails 70 that each includes an upper attachment region 72 and a base attachment region 74, as illustrated in FIG. 11. The upper attachment region 72 may be used to facilitate attachment of the living hinge 54 and the weather-strip 76 to the mounting rail 70. In one configuration, the upper attachment region 72 includes two legs 80. At least one of the legs 80 has a portion that is directed toward the other leg 80 to define a partially enclosed channel 82. The channel 82 may have a height and a width that are approximately the same as the lower hinge section 58 such that the lower hinge section 58 is retained in the channel 82.

The mounting portion 24 not only facilitates attachment of the lid portion 22 to the base portion 20 but also facilitates attachment of the adjustable toolbox 10 to the pickup bed. As illustrated in FIG. 11, the base attachment region 74 may comprise an arcuate or curved portion 75 to generally conform to the shape of the lip 40. The base attachment region 74 thereby supports the lip 40 and retains the base portion 20 in a stationary position with respect to the mounting rail 70. The lip 40 may be attached to the base attachment region 74 using a variety of mechanism such as an adhesive or a mechanical fastener such as screws or rivets (not shown).

Intermediate the upper attachment region 72 and the base attachment region 74, the mounting rail 70 may also include two arms 90 extending therefrom. At least one of the arms 90 has a portion that is directed toward the other arm 90 to define a partially enclosed channel 92 (see FIGS. 11 and 16).

The channel 92 may have a height and a width that are approximately the same as a height and a width of a support arm 100, which is described in more detail below. This configuration thereby enables the support arm 100 to be slidably mounted in the channel 92 (see FIG. 16) so as to telescope to various widths in a direction parallel to channel 92 of mounting rail 70.

To further strengthen the adjustable toolbox 10, an end frame 110 may extend between the mounting rails 70 on opposite sides of the base portion 20. The end frames 110 may be attached to the mounting rails 70 using a variety of techniques.

Similar to the mounting rail 70, the end frame may include an upper attachment region 114 proximate an upper end thereof and a base attachment region 116 proximate a lower end thereof. The upper attachment region 114 may have a channel 118 that is adapted to receive a weather-strip 76 that prevents water from entering the adjustable toolbox 10.

In one configuration, the base attachment region 116 is substantially flat and extends generally transverse to the end frame 110. In other configurations, the base attachment region 116 may be curved similar to the base attachment region on the mounting rails 70.

Figure 13:
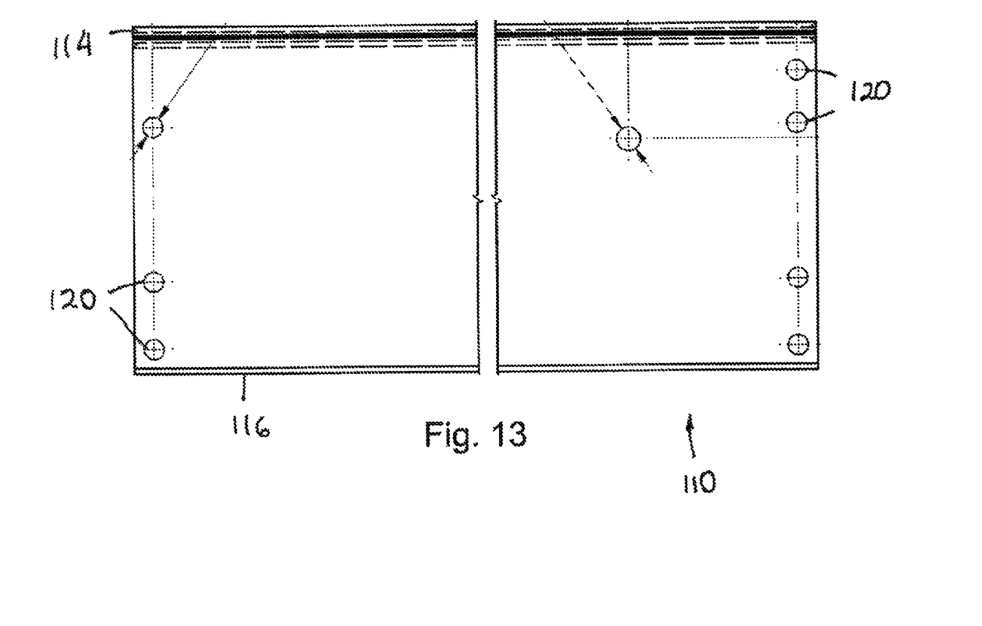
FIG. 13 is a side view of the side panel of the adjustable toolbox.

Proximate opposite ends thereof, the end frame 110 may include a plurality of apertures 120 formed therein, as illustrated in FIG. 13. The apertures 120 may be adapted to receive screws (not shown) that engage the mounting rails 70 through semi-circular recesses 122 that are mounted to the surface thereof. In addition to facilitating the attachment of the end frame 110 to the mounting rails 70, the semi-circular recesses 122 can also increase the strength of the mounting rails 70.

Figure 14:
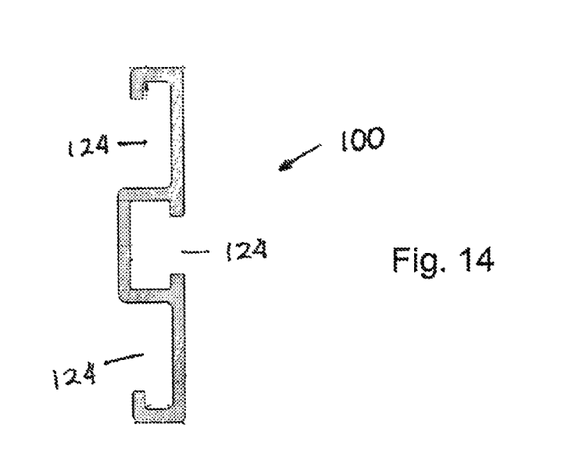
FIG. 14 is an end view of a support arm of the adjustable toolbox.

The support arm 100 may have a generally rectangular configuration, as illustrated in FIG. 14. While it is possible for the support arm 100 to be substantially solid, the support arm 100 may be formed with at least one recess 124. The at least one recess reduces the weight of the support arm 100 and reduces the manufacturing costs as compared to using a solid configuration.

A mounting bracket 130 is attached to an end of the support arm that is opposite the mounting rail 70. The mounting bracket 130 facilitates attachment of the adjustable toolbox 10 to the pickup bed. While it is possible to attach the mounting bracket 130 to the pickup bed using a fastener such as a bolt or screw, it is generally not desired to use such a mechanism for attaching the mounting bracket 130 to the pickup bed because forming holes in the pickup bed could degrade the strength of the pickup bed and could provide locations in which rust initiates.

In certain embodiments, the mounting bracket 130 is formed with a length that causes at least a portion of the base portion 20, the lid portion 22 and the mounting portion 24 are above an upper surface of the pickup bed to which the adjustable toolbox 10 is mounted. In such a configuration, the lid portion 22 may not only extend over the base portion 20 but also part of the pickup bed. For example, the lid portion 22 may extend over a front portion of the pickup bed.

Figure 16:
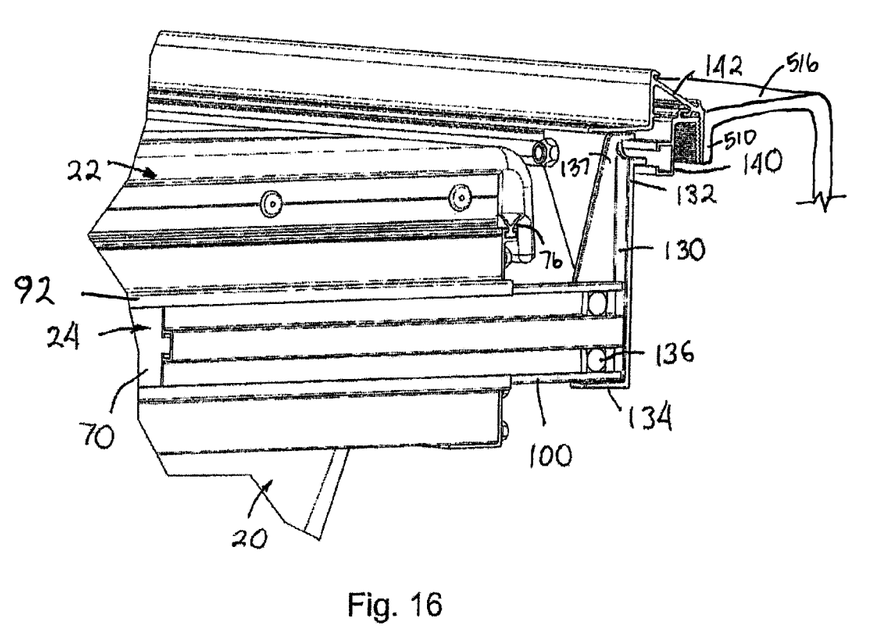
FIG. 16 is a perspective view showing attachment of the adjustable toolbox to a tonneau cover mounting rail.
Figure 17:
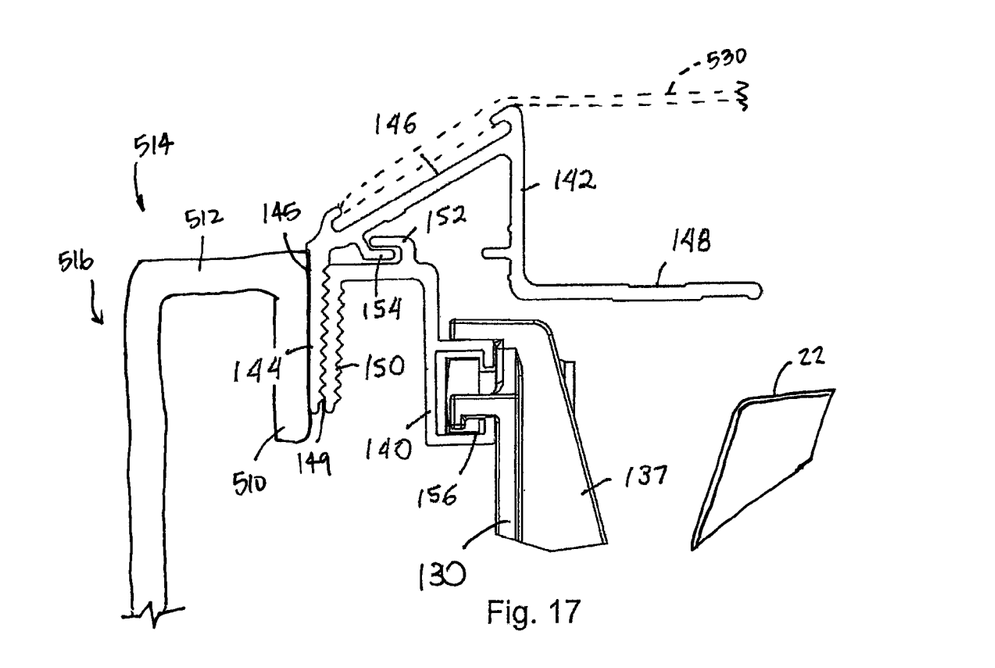
FIG. 17 is an enlarged side view of attachment of the adjustable toolbox to the tonneau cover mounting rail.

In certain embodiments, as illustrated in FIGS. 16 and 17, the mounting bracket 130 includes an upper bracket portion 132 and a lower bracket portion 134. The lower bracket portion 134 may be attached to the support arm 100 using a fastening mechanism 136. The upper bracket portion 132 may have a mounting arm 137 extending therefrom.

A hanger rail 140 may be used for attachment of the mounting bracket 130 to the pickup bed, especially when a tonneau track 142 is attached to the pickup bed. The tonneau track 142 may be used for a variety of purposes such as attaching a soft tonneau cover to the pickup bed. However, it should be understood that the tonneau track 142 is not required and hanger rail 140 can be coupled directly to the sidewall of the pickup bed using conventional clamps.

As illustrated in FIGS. 16 and 17, the tonneau track 142 may include three primary sections—an attachment region 144, a fastener region 146 and a support region 148. The tonneau track 142 is attached to the pickup bed using a clamp (not shown) that engages the attachment region 144 and the pickup bed. To enhance the frictional engagement of the components, the outboard surface 145 of the attachment region 144 may be textured such as including at least one groove in the surface thereof. More particularly, in some embodiments, tonneau track 142 can be coupled to an inboard vertical portion 510 downwardly extending from a horizontal portion 512 of a sidewall flange 514 of a sidewall 516. Sidewall flange 514 and/or sidewall 516 can define any one of a number of cross-sectional profiles desired by a vehicle manufacturer. Moreover, attachment region 144 of tonneau track 142 can be configured to complement any cross-sectional profile of sidewall flange 514 and/or sidewall 516. Therefore, the particular cross-sectional arrangement should not be regarded as limiting the present application. It should be noted, however, that in some embodiments as illustrated an uppermost top surface of lid portion 22 (thus representing the uppermost portion of adjustable toolbox 10 other than attachment members) can be disposed below the uppermost top surface (i.e. horizontal portion 512) of sidewall 516. In some embodiments, however, the uppermost top surface of lid portion 22 can simply be below a tonneau cover 530 (FIG. 17)

Figure 15:
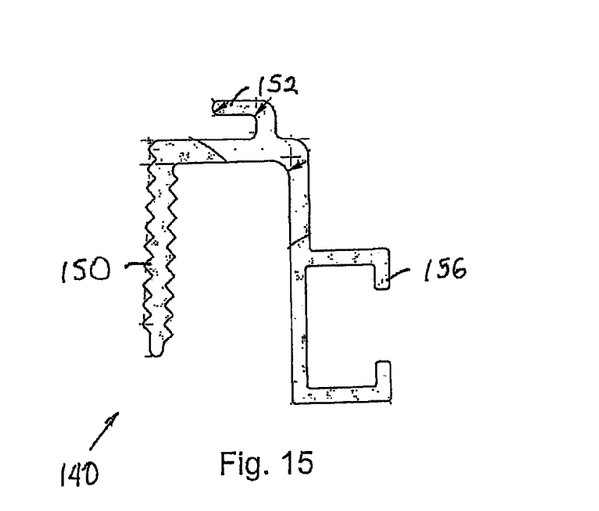
FIG. 15 is an end view of a mounting rail of the adjustable toolbox.

The hanger rail 140 includes an attachment region 150 that may be placed adjacent the attachment region 144 prior to clamping, as illustrated in FIGS. 15-17. To minimize the potential of the attachment region 144 moving with respect to the attachment region 150, a surface of the attachment region 150 and/or attachment region 144 may include at least one groove in the surface thereof and/or several grooves on both tonneau track 142 and hanger rail 140 complementary to each other to define an interference fit 149 therebetween.

The hanger rail 140 may also include an arm 152 extending from an upper surface thereof. The arm 152 may engage a complementarily shaped arm 154 that extends from the tonneau track 142 to further reduce the potential of the hanger rail 140 moving with respect to the tonneau track 142.

A lower end of the hanger rail 140 may include a channel 156 formed therein. The channel 156 may receive the mounting arm 137 for attaching the adjustable toolbox 10 to the pickup bed, as illustrated in FIG. 17. This arrangement permits mounting bracket 130 (namely mounting arm 137) to be slidably received within channel 156 of hanger rail 140 to permit sliding movement of adjustable toolbox 10 (namely base portion 20 and lid portion 22) in a direction fore and aft along a vehicle centerline within the pickup bed. It should be noted that this fore and aft movement along the vehicle centerline (i.e. second direction) is generally orthogonal to movement of support arms 100 relative to mounting rail 70 (i.e. first direction).

Because the adjustable toolbox 10 is recessed below an upper surface of the pickup bed, the adjustable toolbox 10 may be used in conjunction with a tonneau cover that is attached to the surface of the pickup bed. When the tonneau cover is in the closed configuration, the tonneau cover extends over the adjustable toolbox 10 as well as the rest of the pickup bed.

From the foregoing, it should be appreciated that according to the principles of the present teachings, base portion 20 can be supported by base attachment region 74 of mounting rail 70 such that a bottom surface of base portion 20 is suspended above the floor of the pickup bed (and with no portion of adjustable toolbox 10 contacting the bottom wall or surface of the pickup bed). In this way, in some embodiments, the full weight of base portion 20 and lid portion 22 (and its contents) is supported, suspended, and/or carried by mounting rails 70, support arms 100, mounting brackets 130, and hanger rails 140 and thus carried by the sidewalls of the pickup bed. In other words, adjustable toolbox 10 can be fully and completely hung from the sidewalls of the pickup bed, thereby transferring all load bearing forces through the sidewalls of the pickup bed and eliminating any contact with the floor of the pickup bed. This arrangement provides a number of advantages over toolbox systems that are mounted or rolled on the floor of the pickup bed, such as, but not limited to, providing a smooth operation irrespective of contents on the floor of the pickup bed, reduced potential for corrosion between the adjustable toolbox 10 and the pickup bed (because of its elevated configuration), simplified cleaning of the pickup bed, the ability to carry elongated items below the toolbox without removing the adjustable toolbox 10, and the like.

In certain embodiments, the mounting rails 70, the end frames 110 and the support arms 100 are formed from a lightweight but strong material. One such suitable material is aluminum, which may be formed by extrusion.

In certain embodiments, the adjustable toolbox 10 may be movably mounted in the pickup bed. For example, the adjustable toolbox 10 may be slidable from a front of the pickup bed to an intermediate area or back of the pickup bed. Slidable mounting may be done using a variety of techniques such as sliding a surface with respect to another surface. It is also possible to use rollers to facilitate moving the adjustable toolbox 10 with respect to the pickup bed. To achieve such slidable movement of adjustable toolbox 10, in some embodiments, hanger rail 140 can be extended in length to run from a first position (such as adjacent the front wall) in the pickup bed to a second position (such as adjacent the tailgate) in the pickup bed. This permits adjustable toolbox 10, specifically base portion 20 and lid portion 22, carried by mounting rails 70, support arms 100, and mounting brackets 130, to slide along hanger rail 140 from the first position to the second position, or any position therebetween. In some embodiments, a retention system, such as a retractable pin and slot combination, can be used to retain the base portion 20 and lid portion 22 in a predetermined position within the pickup bed.

While the sidewalls in certain pickup beds are generally parallel to each other, the sidewalls in certain pickup are not oriented in a parallel relationship to each other. The mounting bracket or other portions of the adjustable toolbox 10 may be flexible or otherwise adjustable to facilitate adjusting a width of the adjustable toolbox 10 so that the adjustable toolbox 10 does not come off of the track or rail to which it is mounted. More particularly, by virtue of the design of the present teachings, adjustable toolbox 10 can accommodate such variations without the need for modification. That is, as described herein, support arms 100 are slidably received and are capable of telescoping within mounting rails 70, as illustrated. As adjustable toolbox 10 is slid from a first position to a second position, support arms 100 can slide inwardly or outwardly (cross vehicle) within mounting rails 70 to maintain engagement of mounting brackets 130 with hanger rails 140. In this way, base portion 20 and lid portion 22 remain fully supported by hanger rails 140 (and the sidewall of the pickup bed) above the floor of the bed despite non-parallel sidewalls.

It should also be recognized that the sliding arrangement of support arms 100 and mounting rails 70 further permits a single adjustable toolbox 10 to be used for a wide range of pickup beds. That is, so long as base portion 20 and lid portion 22 are sized for the smallest targeted pickup bed, then support arms 100 can be extended in length such that they extend to nearly double the width of the base portion 20. For example, if base portion 20 is three (3) feet wide, then each support arm 100 can be about one and a half (1.5) feet wide and can extend nearly their full length (with some overlap needed to remain engaged with mounting rails 70). Therefore, this exemplary adjustable toolbox could be used in pickup beds ranging from about three (3) feet wide to about six (6) feet wide, without modification. If it is desired that the base portion 20 remain easily accessible from one side of the pickup truck while sliding fore/aft or for other reasons, then support arms 100 on that desired side can be fixedly retained within mounting rails 70, such as via a retention device (engaging fastener, pin/slot, etc.), so that extension of mounting arms 70 on the opposite side of adjustable toolbox 10 accommodate width and/or mounting variations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An adjustable toolbox for use in conjunction with a bed on a pickup, the pickup bed having a floor surface and a pair of upstanding walls extending therefrom, the adjustable toolbox comprises:
   a base portion having a recess formed therein that is adapted to receive at least one object;
   a pair of hanger rail portions each attachable to the pair of upstanding walls of the pickup bed, each of said pair of hanger rail portions having a channel such that said channels are non-parallel thereby defining a variable distance therebetween;
   a mounting rail coupled to said base portion, said mounting rail having an arcuate portion, said arcuate portion engaging a lip portion formed in said base portion for retaining said base portion relative to said mounting rail;
   a pair of support arms, at least one of said pair of support arms being movably coupled to said mounting rail, said at least one of said pair of support arms being movable relative to said mounting rail in a first direction; and
   a mounting bracket extending from each of said pair of support arms, said mounting brackets each being slidably engaged with said non-parallel channel of a respective one of said pair of hanger rail portions to permit sliding of said base portion relative to said pair of hanger rail portions in a second direction, said at least one of said pair of support arms being movable to accommodate said variable distance in said first direction,
   wherein said mounting rail, said pair of support arms, said mounting brackets, and said pair of hanger rail portions together fully support and suspend said base portion in a position spaced apart from the floor surface of the pickup bed.

2. The adjustable toolbox according to claim 1 wherein said first direction is orthogonal to said second direction.

3. The adjustable toolbox according to claim 1 wherein said at least one of said pair of support arms is telescopically coupled to said mounting rail.

4. The adjustable toolbox according to claim 1 wherein said mounting brackets remain slidably engaged with said non-parallel channels as said base portion is moved between a fore position and an aft position along said second direction.

5. The adjustable toolbox according to claim 1, further comprising:
a lid portion pivotally coupled to at least one of said base portion and said mounting rail, said lid portion operable to enclose said recess of said base portion,
wherein said mounting brackets and said pair of hanger rail portions together fully support and suspend said base portion and said lid portion in a position spaced below an uppermost edge of the pair of upstanding walls.

6. The adjustable toolbox according to claim 5, wherein said lid portion is pivotally coupled to said at least one of said base portion and said mounting rail with a living hinge, said living hinge having a floor hinge section, an upper hinge section and a flexible central section that operably connects the floor hinge section and the upper hinge section.

7. The adjustable toolbox according to claim 1 wherein each of said pair of support arms comprises a C-shaped cross-section.

8. The adjustable toolbox according to claim 1, wherein the base portion includes a bottom wall, a pair of side walls and a pair of end walls that define the recess.

9. The adjustable toolbox according to claim 1, wherein at least one of the bottom wall, the pair of side walls and the pair of end walls has at least one rib formed therein.

10. The adjustable toolbox according to claim 1, further comprising:
a tonneau cover spanning the pickup bed; and
a tonneau track attachable to at least one of the pair of upstanding walls of the pickup bed and said pair of hanger rail portions, said tonneau track securing said tonneau cover completely above said base portion.

11. The adjustable toolbox according to claim 10 wherein said tonneau track is captured and retained between one of said pair of hanger rail portions and the upstanding wall of the pickup bed.

12. The adjustable toolbox according to claim 10 wherein one of said pair of hanger rail portions comprises a first plurality of grooves and said tonneau track comprises a second plurality of grooves, said first plurality of grooves engaging said second plurality of grooves.

13. The adjustable toolbox according to claim 1 wherein another of said pair of support arms is fixedly coupled to said mounting rail.

14. An adjustable toolbox for use in conjunction with a bed on a pickup, the pickup bed having a floor surface and a pair of upstanding walls extending therefrom, the adjustable toolbox comprises:
a base portion having a recess formed therein that is adapted to receive at least one object;
a pair of hanger rail portions each attachable to the pair of upstanding walls of the pickup bed, each of said pair of hanger rail portions having a channel such that said channels are non-parallel thereby defining a variable distance therebetween;
a mounting rail coupled to said base portion, said mounting rail having an arcuate portion engaging a lip portion formed in said base portion for retaining said base portion relative to said mounting rail;
a pair of support arms each slidably coupled to said mounting rail, said pair of support arms each sliding relative to said mounting rail; and
a mounting bracket extending from each of said pair of support arms, said mounting brackets each being slidably engaged with said non-parallel channel of a respective one of said pair of hanger rail portions.

15. An adjustable toolbox for use in conjunction with a bed on a pickup, the pickup bed having a floor surface and a pair of upstanding walls extending therefrom, the adjustable toolbox comprises:
a base portion having a recess formed therein that is adapted to receive at least one object;
a pair of hanger rail portions each attachable to the pair of upstanding walls of the pickup bed, each of said pair of hanger rail portions having a channel such that said channels are non-parallel thereby defining a variable distance therebetween;
a mounting rail coupled to said base portion;
a pair of support arms each slidably coupled to said mounting rail, said pair of support arms each sliding relative to said mounting rail;
a mounting bracket extending from each of said pair of support arms, said mounting brackets each being slidably engaged with said non-parallel channel of a respective one of said pair of hanger rail portions;
a tonneau cover spanning the pickup bed; and
a tonneau track attachable to at least one of the pair of upstanding walls of the pickup bed and said pair of hanger rail portions, said tonneau track securing said tonneau cover completely above said base portion, said tonneau track being captured and retained between one of said pair of hanger rail portions and the upstanding wall of the pickup bed.

16. The adjustable toolbox according to claim 15 wherein one of said pair of hanger rail portions comprises a first plurality of grooves and said tonneau track comprises a second plurality of grooves, said first plurality of grooves engaging said second plurality of grooves.

* * * * *